United States Patent [19]

Kobayashi et al.

[11] Patent Number: 4,917,328

[45] Date of Patent: Apr. 17, 1990

[54] REEL DRIVING MECHANISM

[75] Inventors: Junji Kobayashi; Makoto Fujiki, both of Tokyo; Takashi Kimura; Masahiro Ando, both of Kanagawa; Hidetoshi Matsuoka, Tokyo, all of Japan

[73] Assignee: Canon Kabushiki Kaisha, Tokyo, Japan

[21] Appl. No.: 265,544

[22] Filed: Nov. 1, 1988

[30] Foreign Application Priority Data

Nov. 5, 1987 [JP] Japan ................................. 62-278264

[51] Int. Cl.⁴ ...................... B65H 16/00; B65H 18/08
[52] U.S. Cl. .................................... 242/204; 242/68.3; 360/96.3
[58] Field of Search ...................... 242/68.3, 200, 201, 242/204, 208; 360/96.3

[56] References Cited

U.S. PATENT DOCUMENTS 3,888,432 6/1975 Katoh ................................. 242/201
4,346,414 8/1982 Osanai ............................ 242/200 X
4,391,416 7/1983 Osanai ................................. 242/200
4,709,871 12/1987 Tanaka et al. ...................... 242/68.3

Primary Examiner—Stanley N. Gilreath
Attorney, Agent, or Firm—Robin, Blecker, Daley & Driscoll

[57] ABSTRACT

A reel driving mechanism is provided with a braking member for braking a rotary member which rotates a reel table via a torque limiting member, in correspondence with the direction of rotation of the reel table and in interlinking relation with the reel table.

11 Claims, 3 Drawing Sheets

REEL DRIVING MECHANISM

BACKGROUND OF THE INVENTION

1. Field of the Invention

The present invention relates to a reel driving mechanism for limiting the rotational torque for driving a reel table in an adaptive manner as well as a tape recorder having such a mechanism.

2. Description of the Related Art

Conventionally, when a tape is to be traveled in a reverse direction, a tape recorder is provided, on the side of a take-up reel, with a mechanism for applying brakes to a reel table since it is necessary to apply a certain degree of tension to the tape. In addition, this mechanism is so arranged to release the brakes when the tape is run in a forward direction, since the mechanism applies load to the take-up reel being driven.

FIG. 1 is a schematic top plan view of the take-up reel driving mechanism in a conventional video tape-recorder. This reel driving mechanism comprises the following component parts: a reel shaft 19; a reel table 20; a gear 21 for rotating the reel table 20 via a slip member such as felt (not shown); a brake claw 22 for fixing the gear 21, as necessary; a rotary shaft 23 of the brake claw 22; a spring 24 for urging the brake claw 22 counterclockwise; and a mode lever 25 for controlling the turn of the brake claw 22.

In the mechanism shown in FIG. 1, the brake torque at the time of running the tape in the reverse direction is set to substantially the same level as that of the take-up torque at the time when the tape is run in the forward direction. Namely, as the brake claw 22 is turned by the movement of the mode lever 25, a distal end portion 22a of the brake claw 22 is brought into contact with the reel gear 21 which is arranged to impart fixed torque to the reel table 20 when the tape is run in the forward direction. Consequently, this brake claw 22 stops the reel gear 21 when the tape is run in the reverse direction, thereby allowing fixed torque to be obtained. This is a frequently adopted system.

Also, there is another system in which braking torque for back tension is constantly applied to the take-up reel table.

As described above, in the conventional system in which the brake claw is operated by the movement of the mode lever, the mode lever has to be moved. Therefore, there have been drawbacks in that the use of the mode lever itself and driving mechanism therefor results in the tendency of the apparatus becoming large in size, higher costs, and larger weight, and that time is required for moving the mode lever during a changeover of the tape traveling direction, thereby making it impossible to effect a speedy changeover of the aforementioned traveling directions.

In addition, in the system in which the braking torque for back tension is constantly applied to the reel table, the above-described drawbacks are not present. However, since braking torque for back tension acts when the tape is run in the forward direction, there has been a problem in that the loss of the reel driving force is large.

SUMMARY OF THE INVENTION

Accordingly, an object of the present invention is to overcome the above-described drawbacks of the conventional art.

Another object of the present invention is to provide a reel driving mechanism which, with a simple structure, is capable of changing over braking torque acting on the reel depending on the direction of rotation of the reel.

To these ends, according to one aspect of the present invention there is provided a reel driving mechanism comprising: a reel table; a torque limiting member; a rotary member for driving the reel table via the torque limiting member; and a braking member adapted to be interlinked mechanically with the reel table and brake the rotary member, the braking member acting only when the direction of rotation of the reel table is a predetermined direction.

Still another object of the present invention is to provide a tape recorder in which a changeover in the direction of tape traveling is carried out speedily and no load occurs when a reel is driven.

To this end, according to another aspect of the present invention there is provided a tape recorder comprising: a take-up reel table for taking up a tape; a torque limiting member; a rotating member for driving the reel table via the torque limiting member; and a braking member adapted to be interlinked mechanically with the reel table and brake the rotary member, the baking member acting only when the direction of rotation of the reel table is a direction in which the tape is pulled out from the take-up reel table.

The above and other objects, features and advantages of the present invention will become apparent from the following detailed description of the invention when read in conjunction with the accompanying drawings.

DETAILED DESCRIPTION OF THE PREFERRED EMBODIMENTS

Figure 1:
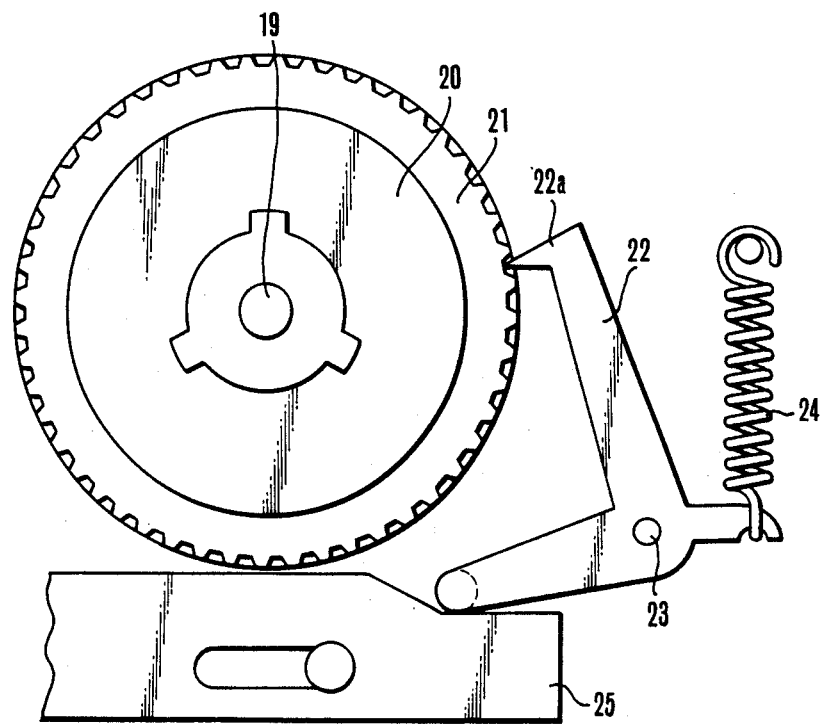
FIG. 1 is a schematic diagram of a reel driving mechanism in a conventional video tape-recorder.
Figure 2:
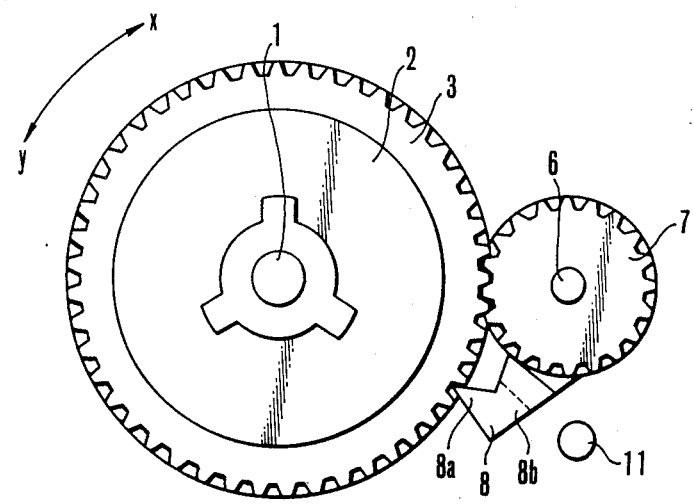
FIG. 2 is a top plan view illustrating a reel driving mechanism in accordance with one embodiment of the present invention.
Figure 3:
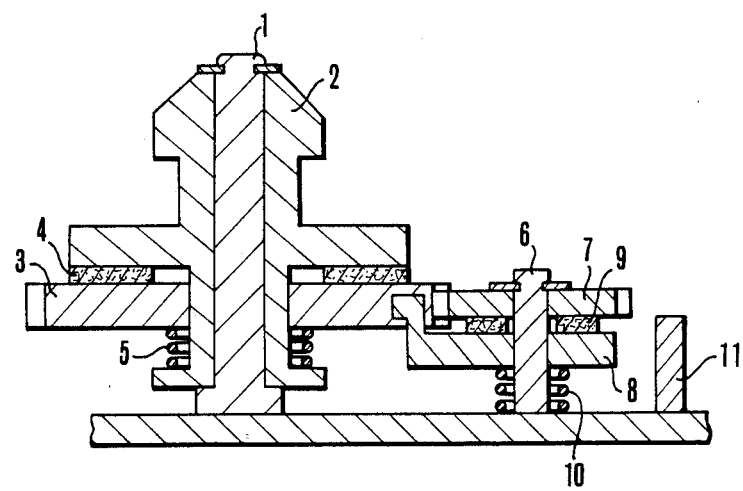
FIG. 3 is a sectional side view of FIG. 2.

FIG. 2 is a top plan view illustrating a reel driving mechanism in accordance with one embodiment of the present invention, and FIG. 3 is a sectional side view of FIG. 2. As shown in FIGS. 2 and 3, the reel driving mechanism comprises the following components: a reel shaft 1; a reel table 2 for taking up; a gear 3 which is rotated by a driving mechanism (not shown) and is brought into pressure-contact with the reel table 2 via a felt 4 which is a torque limiting member provided for applying brakes for back tension, thereby imparting fixed torque to the reel table 2; a rotary shaft 6; a changeover gear 7 for coupling with the gear 3; a change lever 8 which is turned about the shaft 6, and which, if turned clockwise, allows a claw portion 8a to be brought into contact with the gear 3 to arrest the gear 3 and, if turned counterclockwise, allows an arm 8b to brought into contact with a stopper 11. The lever 8 is brought into pressure-contact with the gear 7 by a spring 10 via a felt 9, and the lever 8 is also turned with the rotation of the gear 7. In addition, the spring 1 is adapted to press the felt 9, while the stopper 11 is used for stopping the change lever 8.

In the above-described arrangement, if the gear 3 is driven by the driving mechanism (not shown) in the forward direction of tape traveling (in the direction of an arrow x in FIG. 2), the lever 8 is turned counterclockwise, is brought into contact with the stopper 11, and stops as a result. Accordingly, only the small torque in the portion of the felt 9 serves as the load with respect to the driving force of the reel table 2, and the reel table 2 is rotated in this state.

If the tape is run in the reverse direction by a supply reel (not shown), the reel table 2 is rotated in the direction of an arrow y in FIG. 2 by means of the tape (not shown). In that case, the lever 8 is turned clockwise, the claw portion 8a abuts against the teeth of the gear 3, thereby stopping the rotation of the gear 3. Subsequently, the tape is run in the reverse direction while back tension is being applied to the tape due to the frictional torque between the gear 3 and the reel table 2 which is caused by the felt 4 serving as the torque limiting member.

By virtue of the above-described operation, it is possible to eliminate wasteful time, mechanism and power involved in the use of the conventional mode lever and a driving mechanism at the time when the tape traveling direction is inverted from the forward direction to the reverse direction or vice versa. At the same time, it is possible to drive the reel table 2 with a small level of torque just sufficient to turn the lever 8 when the tape is run in the forward direction.

Figure 4:
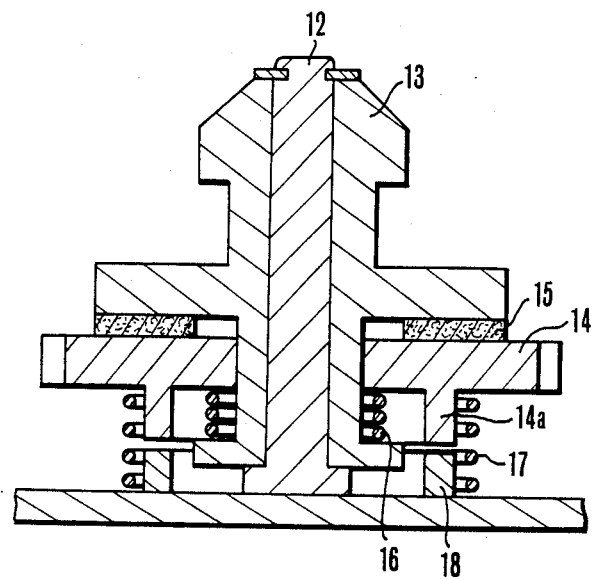
FIG. 4 is a sectional side view of the reel driving mechanism in accordance with another embodiment of the present invention.

FIG. 4 illustrates a sectional side view illustrating another embodiment of the reel driving mechanism in accordance with the present invention. The reel driving mechanism in accordance with this embodiment comprises the following components: a reel shaft 12; a reel table 13; and a gear 14 which is rotated by a driving mechanism (not shown) and is adapted to impart fixed torque to the reel table 13 by being brought into pressure-contact with the reel table 13 via a felt 15 serving as a torque limiting member by means of a spring 16 for pressing the felt 15. Further, the reel driving mechanism comprises a cylindrical projection 18 of a chassis and a helical member 17 which is twined around the cylindrical projection 18 and a cylindrical projection 14a of the gear 14, constituting a so-called one-way clutch whereby the gear 14 rotates in the direction of the arrow x in FIG. 2 but does not rotate in the direction of the arrow y.

In the above-described arrangement, if the gear 14 is driven in the direction in which the reel table 13 causes the tape to travel in the forward direction (in the direction of the arrow x in FIG. 2), the reel table 13 is rotated while only the small torque acting in the direction of escape of the one-way clutch constituted by the helical member 17 serves as load acting on the driving force.

On the other hand, if the tape is run in the reverse direction, the reel table 13 is rotated in the direction of the arrow y in FIG. 2 by the tape (not shown). In that case, the one-way clutch constituted by the helical member 17 secures the gear 14 against the cylindrical projection 18 embedded in the chassis, the tape is run in the reverse direction while back tension is being applied thereto due to the frictional torque between the gear 14 and the reel table 13 which is caused by the felt 15 serving as the torque limiting member.

Thus, it is possible to eliminate the wasteful time and mechanism conventionally required during the operation of the mode lever at the time of shifting the tape traveling direction from the forward direction to the reverse direction or vice versa. At the same time, the reel table can be driven with a small level of loss torque in the direction of escape of the one-way clutch when the tape is run in the forward direction.

Although, in the above-described embodiments, the transmission of a driving force for such as rotation or stopping is carried out by the gears 13 and 14, idlers may be used instead of the gears.

As has been described above, in accordance with the present invention, since means for braking a reel table in interlinking relationship therewith is provided in correspondence with the direction of rotation of the reel table, there are advantages in that it is possible to effect a speedy change of the mode without wasting a reel driving force at the time of changing the direction of tape traveling, and that the power for driving the mode lever, components and space can be eliminated.

What is claimed is:

1. A reel driving mechanism comprising:
   (a) a reel table;
   (b) a torque limiting member;
   (c) a rotary member for driving said reel table via said torque limiting member; and
   (d) a braking member for braking said rotary member, said braking member acting only when the direction of rotation of said reel table is a predetermined direction, and said braking member including a movable member driven by the rotating force of said rotary member.

2. A mechanism according to claim 1, wherein said braking member further includes a torque limiting part for transmitting the rotating force of said rotary member to said movable member.

3. A mechanism according to claim 2, wherein said braking member further includes a stopper for inhibiting the moving of said movable member in a predetermined direction.

4. A mechanism according to claim 1, wherein said movable member has a gearing portion for gearing with a portion of said rotary member.

5. A mechanism according to claim 1, wherein said rotary member includes a first rotary part rotating coaxially with said reel table and a second rotary part coupled with said first rotary part.

6. A mechanism according to claim 5, wherein said braking member includes a torque limiting part and said movable member is driven by said second rotary part via said torque limiting member.

7. A mechanism according to claim 6, wherein said movable member rotates coaxially with said second rotary part and has a gearing portion for gearing with a portion of said first rotary part.

8. A reel driving mechanism comprising:
   (a) a base plate;
   (b) a reel table relatively rotatable to said base plate;
   (c) a torque limiting member;
   (d) rotary member for driving said reel table via said torque limiting member; and
   (e) a braking member for braking said rotary member, said braking member acting only when the direction of rotation of said reel table is a predetermined direction, and said braking member including a one-way clutch acting between said rotary member and said base plate.

9. A mechanism according to claim 8, wherein said rotary member includes a rotary body rotating coaxially with said reel table, and wherein said one-way clutch is disposed coaxially with said rotary body.

10. A tape recorder comprising:
(a) a take-up reel table for taking up a tape;
(b) a torque limiting member;
(c) a rotary member for driving said reel table via said torque limiting member; and
(d) a braking member for braking said rotary member, said braking member acting only when the direction of rotation of said reel table is a direction in which the tape is pulled out from said take-up reel table, said braking member including a movable member which has a gearing portion gearing with a portion of said rotary member and is driven by the rotating force of said rotary member, and a torque limiting member for transmitting the rotational force of said rotary member to said movable member.

11. A tape recorder comprising:
(a) a base plate;
(b) a take-up reel table arranged to be relatively rotatable to said base plate;
(c) a torque limiting member;
(d) a rotary member for driving said reel table via said torque limiting member; and
(e) a braking member for braking said rotary member, said braking member including a one-way clutch acting between said rotary member and said base plate.

* * * * *